United States Patent [19]

Azarov et al.

[11] 4,082,975

[45] Apr. 4, 1978

[54] BRUSH MOUNTING DEVICE FOR DYNAMOELECTRIC MACHINE

[76] Inventors: Evgeny Mikhailovich Azarov, Zagorodny prospekt, 45, kv. 22; Valery Nikolaevich Andrushev, Novo-Izmailovsky prospekt 44, korpus 1, kv. 6; Garri Mikhailovich Khutoretsky, Altaiskaya ulitsa 2, kv. 5, all of Leningrad, U.S.S.R.

[21] Appl. No.: 665,875

[22] Filed: Mar. 11, 1976

[51] Int. Cl.[2] .......... H02K 13/10

[52] U.S. Cl. .......... 310/239

[58] Field of Search .......... 310/238, 239, 240, 245, 310/247

[56] References Cited

U.S. PATENT DOCUMENTS 3,387,155 6/1968 Krulls .......... 310/239

*Primary Examiner*—Donovan F. Duggan

*Attorney, Agent, or Firm*—Fleit & Jacobson

[57] ABSTRACT

The invention discloses a device comprising two stationary current-conducting plates with contact members secured thereon and removable contact brush units, each having contact brushes, arrangement for retaining the brushes in the brush unit, a contact member for effecting electric contact between the brush unit and the stationary current-conducting plates, means for securing the brush unit in the device and a handle for mounting and removing the brush unit bodily, the contact surfaces of the contact members of the stationary plates and the contact surface of the contact member of the brush unit being flat and being aligned in a single plane in the operative position of the brush unit, whereby the requirements as to the manufacturing accuracy of these contact-making surfaces become less strict, and the manufacture of the contact members is simplified.

5 Claims, 5 Drawing Figures

BRUSH MOUNTING DEVICE FOR DYNAMOELECTRIC MACHINE

The present invention relates to dynamoelectric machines and, more particularly, it relates to brush mounting devices for dynamoelectric machines with removable brush units, wherein these brush units can be removed and mounted on the run of the dynamoelectric machine.

The great power ratings of present-day dynamoelectric machines, such as power generators for electric power supply system, render very expensive in terms of energy wasted any prolonged stoppage of a power generator and disconnection thereof from the power system for brush replacement. Therefore, the task of developing the structures of the brush mounting devices of dynamoelectric machines with removable contact brush units, which should provide for removing the contact brushes in operation of the dynamoelectric machine, has recently become extremely urgent.

There is known a brush mounting device of a dynamoelectric machine with removable brush units, comprising two stationary contact plates rigidly connected with each other, the plates supporting thereon contact members defining a wedge-shaped contact surface. The brush unit incorporates a contact member likewise having an inclined or wedge-shaped contact surface.

The brush unit is secured in the brush mounting device with aid of a means including a rotatable handle connected with the upper end of a shaft extending through a bore in the contact members. The upper end of the shaft carries a spring, while the lower end thereof has an aperture made therein, receiving a pin. When a brush unit is introduced into the mounting device, the pin of a plate secured to the contact members beneath the bore passes through slits. When the handle is rotated, the pin slides along two helical abutments on the bottom side of the plate and is retained in two grooves, the shaft compressing the spring and thus developing an effort sufficient for the contact of the cooperating wedge-shaped contact surfaces.

In this known device, the arrangement for retaining the brushes in the brush unit includes a leaf spring abutting against the lateral surface of the brush and retaining the latter against dropping out. When the handle is rotated into its operative position for securing the brush unit in the brush mounting device, the leaf spring turns and releases the brush.

The wedge-shaped contact surfaces, respectively, of the brush unit and of the stationary plates are to be manufactured with a high accuracy, which complicates the manufacture of the brush assembly.

The means for securing the brush unit in the brush mounting device, of which the structure is determined by the shape of the contact surfaces, also complicates the manufacture of the brush assembly, because the handle is secured on the shaft which is to be positioned with precision. If the position of the shaft is not precise enough, this might lead to slanting and jamming of the shaft, and thus the rotation of the handle would become difficult and, eventually, it would become altogether impossible to either remove or mount the brush unit.

The leaf spring of the brush retaining arrangement, structurally associated with the means for securing the brush unit, is subjected to twisting loads, which curtails its service life.

It is, therefore, an object of the present invention to simplify the manufacture of the contact members of the brush assembly and of the stationary plates of the brush mounting device.

It is another object of the present invention to eliminate the possibility of jamming of the means for securing the brush assembly in the brush mounting device.

It is still another object of the present invention to prolong the service life of the arrangement retaining the contact brushes in the brush unit.

This aim is attained, owing to the contact surfaces of the contact members of the stationary current-conducting plates and the contact surface of the contact member of the brush unit being flat and extending in the same plane, when brought into contact-making engagement.

It is expedient that the means for securing the brush unit in the brush mounting device should include retainers accommodated in the housing of the brush unit and a resilient member having the ends thereof connected with the retainers, notches adapted to receive these retainers being made in the stationry plates, so that at the operative position of the brush unit the retainers are received in these notches, and when the resilient member is displaced toward the handle, the retainers are retracted into the brush unit.

It is further expedient that the arrangement retaining the brushes in the brush unit should include two leaf springs, the first one of these two leaf springs having one end thereof fixedly attached to the housing of the brush unit and having its other free end abutting against the lateral surface of the brush, the other one of these two leaf springs having one end thereof abutting against an insulating strip fixedly attached to the contact member of the brush unit and having its other end connected with the first leaf spring, so that when the pressure exerted by the insulating strip is relieved, the seond leaf spring unbends or uncoils itself, whereby the free end of the first leaf spring is retracted from the lateral surface of the brush, releasing the latter.

The present invention provides for simplifying the manufacture of the contact members, since flat contact surfaces must not be machined with a high accuracy.

Furthermore, the present invention eliminates the possibility of the means securing the brush unit in the brush mounting device getting jammed when the brush unit is removed and mounted.

The disclosed arrangement retaining the brushes in the brush unit offers long service life and automatically retains the brushes when the brush unit is removed from the brush mounting device.

Other objects and advantages of the present invention will become apparent from the following detailed description of an embodiment of the invention, with reference being had to the accompanying drawings, wherein.

Figure 1:
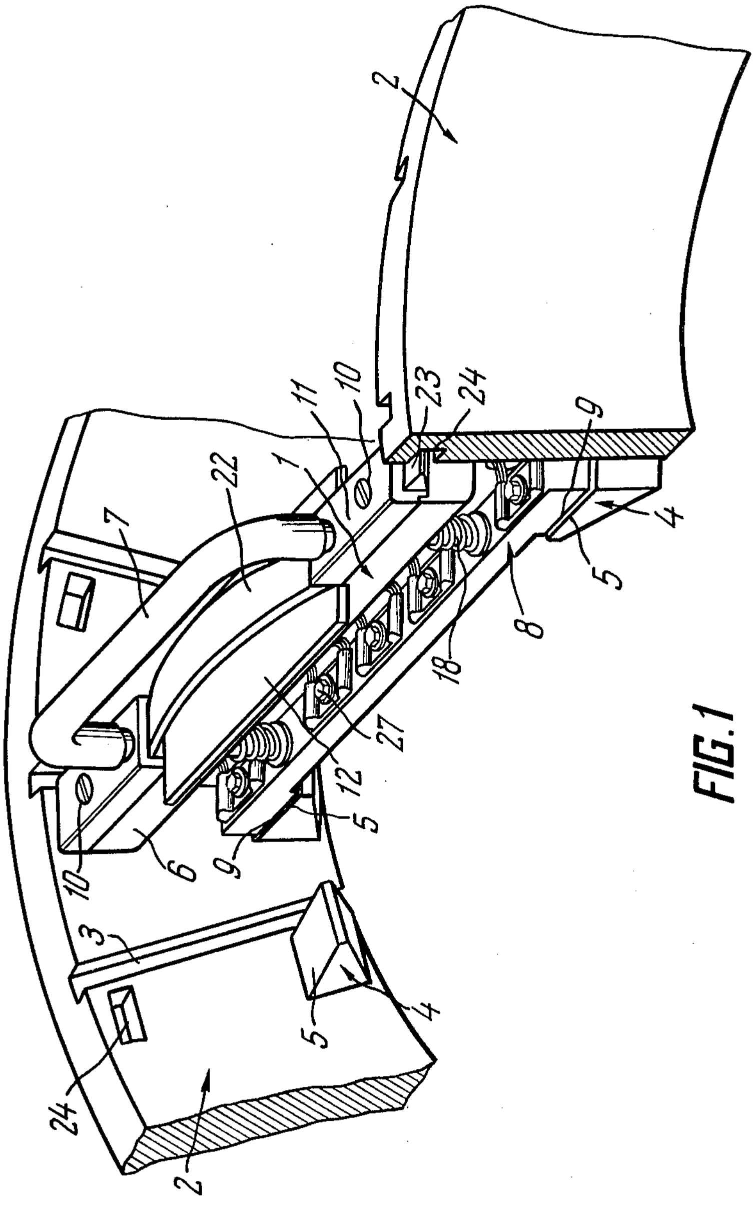
FIG. 1 shows a part of the brush mounting device of a dynamoelectric machine with a removable brush unit, according to the invention.
Figure 2:
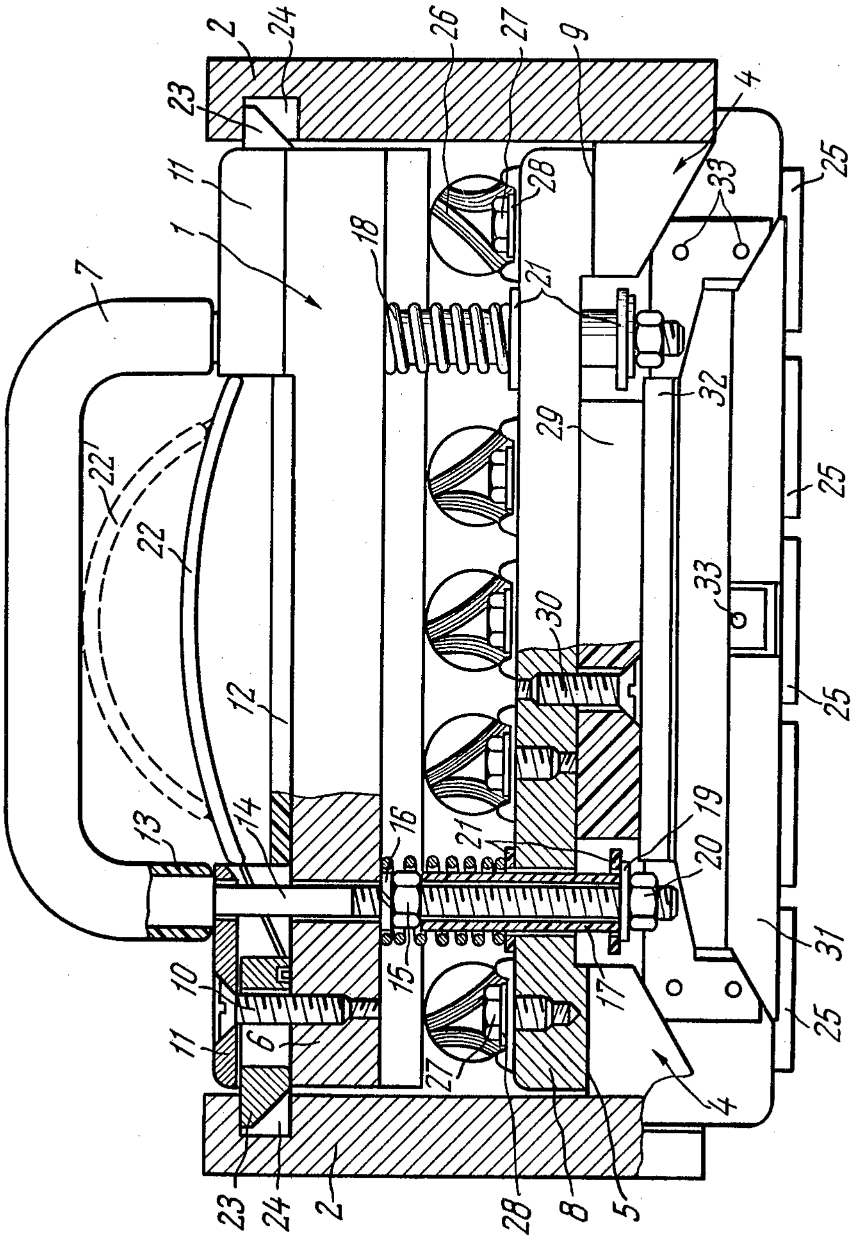
FIG. 2 shows a part of the brush mounting device in accordance with the invention, in a view partly sectional through the brush unit, perpendicularly to the current-conducting plates.
Figure 3:
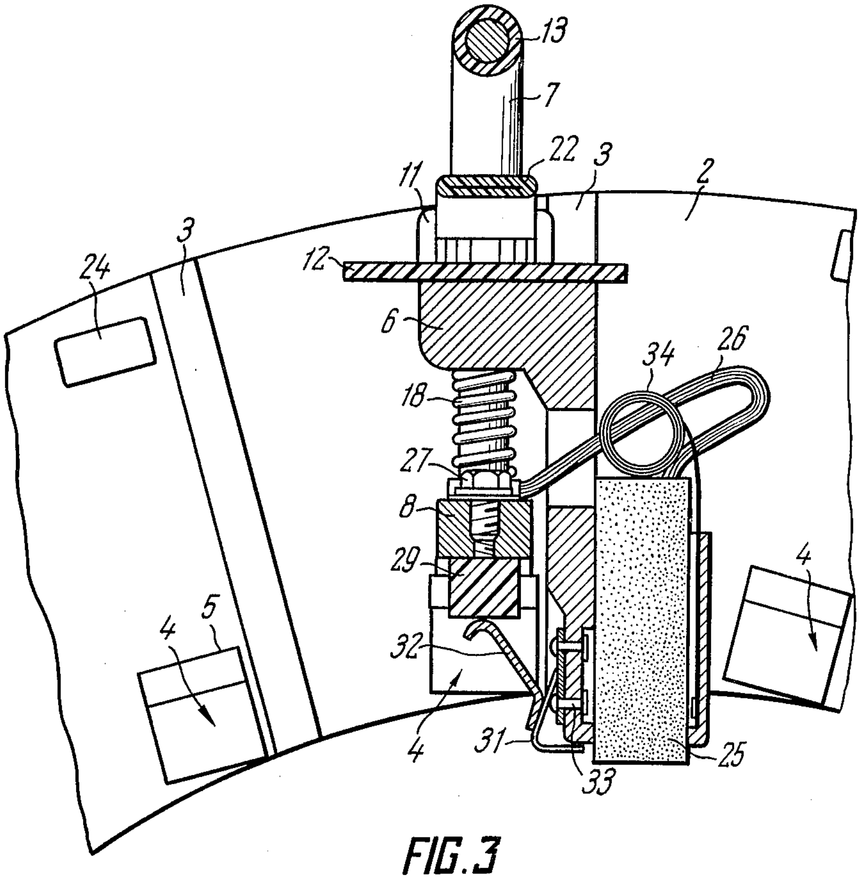
FIG. 3 shows a part of the brush mounting device, in a view partly sectional through the brush unit, parallel with the current-conducting plates, in accordance with the invention.

Referring now in particular to the appended drawings, the brush mounting device for a dynamoelectric machine includes removable brush units or assemblies 1 (FIG. 1) and two stationary annular plates 2 having grooves 3 cut in the internal faces thereof to guide the brush units 1. The plates 2 carry thereon fixedly attached stationary contact members 4 in the form of cantilever racks, each with a flat contact-making surface 5. The removable brush unit 1 includes a housing 6 with lateral projections receivable in the respective guide grooves 3, and a handle 7 by means of which the brush unit 1 can be mounted in the brush mounting device and removed therefrom, the brush unit 1 further having a contact member 8 with a flat contact-making surface 9. The housing 6 has threaded openings for screws 10 securing to the housing a pair of lids 11 which are channel-shaped. To protect the operator from an electric shock, the housing 6 has mounted thereon an insulating gasket 12. The handle 7 is coated with an insulating layer 13 (FIG. 2) and includes posts 14 extending through the respective bores in the housing 6 and secured with nuts 15 with spring-type lock washers 16. The posts 14 receive thereabout insulating sleeves 17 which, in their turn, receive thereabout compression springs 18, the sleeves 18 extending through the contact member 8. The springs 18, the sleeves 17 and the contact member 8 are retained on the posts 14 with washers 19 and nuts 20, the contact member 8 being insulated from the springs 18 and washers 19 by respective insulating washers 21. The arrangement retaining the brush unit 1 in the brush mounting device includes a resilient member 22 and two retaining tabs 23 which, upon the unit 1 having been introduced into the brush mounting device and the contact surfaces 5 and 9 having been brought into contact-making engagement, enter the respective notches 24 provided for the purpose in the stationary plates 2. The channelshaped lids 11 serve to guide the translatory motion of the retaining tabs 23. The removable brush unit 1 includes contact brushes 25 associated with flexible conductors 26 which are secured directly to the contact member 8 by bolts 27 with washers 28. The contact member 8 of the brush unit 1 has also secured thereto an insulating strip 29 held by screws 30. The arrangement retaining the contact brushes 25 in the brush unit 1 includes two leaf springs 31 and 32 secured to each other (FIG. 3). The spring 31 has one its end fixedly secured to the housing 6 of the brush unit 1 with rivets 33, its other end being adapted to bear against the lateral surface of the brush 25. The other leaf spring 32 has one its end fixedly attached to the spring 31, its other end abutting against the insulating strip 29. A coiled spring 34 bears upon the end face of the brush 25, adjacent to the flexible conductors 34.

The herein disclosed device is operated, as follows.

As the brush unit or assembly 1 is being introduced into the brush mounting device, the housing 6 (FIG. 1) has its lateral projections received in the grooves 3 and guided thereby, in which way the bursh unit 1 is inserted bodily along these guide grooves 3. As the contact surface 9 of the contact member 8 engages the respective contact surfaces 5 of the contact members 4, the motion of the contact member 8 is arrested, whereas the housing 6 with the brushes 25 (FIG. 2) is moved further on, against the resistance of the springs 18 which are being compressed, until the retaining tabs 23 are brought against the notches 24, at which position the retaining tabs 23 enter the notches 24 and thus secure the brush unit 1 in the brush mounting device. The resilience of the compressed springs 18 urges the contact surfaces 5 and 9 into reliable contact-making engagement.

Upon the contact member 8 with the insulating strip 29 having been arrested by the contact members 4, the contact brushes 25 and the leaf spring 31 and 32 continue to move with the housing 6.

Figure 4:
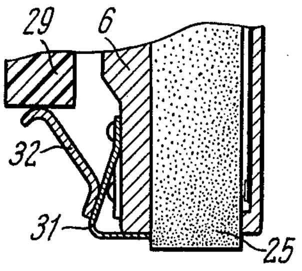
FIG. 4 illustrates the brush retaining arrangement in the operative position of the contact brush, in accordance with the invention.
Figure 5:
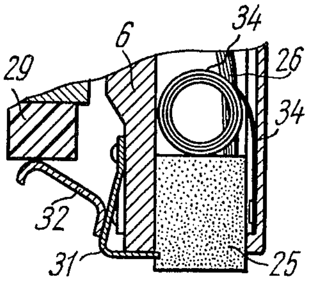
FIG. 5 shows the same brush retaining arrangement, with the brush retained, according to the invention.

Consequently, the pressure of the insulating strip 29 (FIG. 4) upon the free end of the leaf spring 32 is gradually relieved, whereby the inherent resilience of the leaf spring 32 makes the latter uncoil or unbend itself, and the free end of the leaf spring 31 is retracted from the lateral surface of the brush 25, releasing the latter.

Thus, there is completed an electric circuit from the contact brushes 25 (FIG. 3) through the flexible conductors 26 to the contact member 8. From the contact member 8 (FIG. 2) the current flows to the stationary contact members 4 and there-from-to the stationary current-conducting plates 2.

To remove the contact brush unit 1 (FIG. 2), the resilient member 22 is pulled toward the handle 7 into a position 22', whereby the retaining tabs 23 are retracted from the notches 24 into their retracted position under the lids 11, the springs 18 expanding and lifting the housing 6 jointly with the leaf springs 31 and 32. The pressure of the insulating strip 29 increases, whereby the spring 32 becomes bent and urges the free end of the other leaf spring 31 against the lateral surface of the brushes 25, retaining the latter in the housing 6 of the brush unit 1. Now the block unit 1 is bodily pulled by the handle 7 from the brush mounting device.

In has become clear from the abovesaid that the herein disclosed brush mounting device for a dynamoelectric machine with removable contact brush units or assemblies provides for quick replacement of the brush units without stopping the dynamoelectric machine itself and thus without disconnecting it from the power network, the contact members being simple to manufacture and ensuring dependable contact; the arrangement retaining the contact brushes in the brush unit ensuring reliable retaining of the brushes when the brush unit is removed and automatically releasing the brushes as the unit is mounted in the machine, enabling the brushes to attain their operating position.

What we claim is:

1. A brush mounting device for a dynamoelectric machine comprising,
   - a pair of stationary current-conducting plates spaced apart substantially parallel to each other and rigidly connected together;
   - a pair of plate contact members, each plate contact member fixedly secured to each stationary current-conducting plate, said plate contact members having generally planar contact surfaces, wherein said contact surfaces are substantially perpendicular to the current-conducting plate;
   - a removable brush unit for mounting between said stationary current-conducting plates comprising a housing, contact brushes mounted to said housing, a handle means for moving said brush unit between said pair of stationary current-conducting plates, a brush unit contact member having a generally planar contact surface, means for connecting said brush unit contact member to said housing, contact brush retaining means for retaining said brushes in said housing when said brush unit is removed from said current-conducting plates and for releasing said contact brushes from said housing when said brush unit is mounted between said current-conducting plates, wherein when said brush unit is mounted between said current-conducting plates, the contact surfaces of said plate contact member and said brush unit contact member are aligned in the same plane in contact making engagement, and securing means for securing said brush unit between said current-conducting plates.

2. A brush mounting device as set forth in claim 1 wherein said means for connecting said brush unit contact member to said housing comprise means for moving said brush unit contact member with respect to said housing, whereby said brush unit contact member is movable from a first position when said brush unit is moved from its mounting position between said current-conducting plates, to a second position when said brush unit is mounted between said current-conducting plates, wherein said plate contact members maintains said brush unit contact member in its second position when said brush unit is mounted between said current-conducting plates.

3. A brush mounting device as set forth in claim 2, wherein said brush retaining means comprises an insulating strip rigidly secured to said brush unit contact member and movable therewith;

a first leaf spring having two ends;

one end of said first leaf spring being fixedly attached to the housing of said brush unit;

the other end of said first leaf spring being adapted to abut against the lateral surface of said contact brush;

a second leaf spring having two ends;

one end of said second leaf spring abutting against said insulating strip;

the other end of said second leaf spring being connected with said first leaf spring;

wherein when said brush unit contact member is in its second position, said second leaf spring abutting said insulating member is unbent, and said other end of said first leaf spring is retracted from the lateral surface of said contact brush to release the contact brush, and when said brush unit contact member is in its first position, said second leaf spring abutting said insulating member is bent and said other end of said first leaf spring retains said contact brush.

4. A brush mounting device as set forth in claim 2 wherein each said current-conducting plate includes notches, and wherein said housing comprises a pair of retaining tabs, a resilient member having two ends, each end thereof being connected with a separate one of said retaining tabs, wherein said retaining tabs enter said notches when said brush unit is mounted between said current-conducting plates, and means for moving said resilient member for retracting said retaining tabs from said notches as said brush unit is removed from said current-conducting plates.

5. A brush mounting device as set forth in claim 4, including an insulating strip rigidly secured to said brush unit contact member and movable therewith;

a first leaf spring having two ends;

one end of said first leaf spring being fixedly attached to the housing of said brush unit;

the other end of said first leaf spring being adapted to abut against the lateral surface of said contact brush;

a second leaf spring having two ends;

one end of said second leaf spring abutting against said insulating strip;

the other end of said second leaf spring being connected with said first leaf spring, wherein when said brush unit contact member is in its second position, said second leaf spring abutting said insulating member is unbent, an said other end of said first leaf spring is retracted from the lateral surface of said contact brush to release the contact brush, and when said brush unit contact member is in its first position, said second leaf spring abutting said insulating member is bent and said other end of said first leaf spring retains said contact brush.

* * * * *